(12) United States Patent (10) Patent No.: US 8,949,408 B2
Belkine et al. (45) Date of Patent: Feb. 3, 2015

(54) SESSION MONITORING OF VIRTUAL DESKTOPS IN A VIRTUAL MACHINE FARM

(75) Inventors: Artem Belkine, Renton, WA (US); Ido Ben-Shachar, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1089 days.

(21) Appl. No.: 12/642,638

(22) Filed: Dec. 18, 2009

(65) Prior Publication Data
US 2011/0153838 A1 Jun. 23, 2011

(51) Int. Cl.
G06F 15/16 (2006.01)
H04L 29/08 (2006.01)
G06F 9/50 (2006.01)

(52) U.S. Cl.
CPC ............... H04L 67/08 (2013.01); G06F 9/505 (2013.01); H04L 67/14 (2013.01)
USPC ............................... 709/224; 709/228; 718/1

(58) Field of Classification Search
None
See application file for complete search history.

(56) References Cited

U.S. PATENT DOCUMENTS

| 5,666,489 | A * | 9/1997 | Fite et al. ...................... 709/228 |
| 8,191,069 | B2 * | 5/2012 | Watanabe et al. ............. 718/104 |
| 2007/0130305 | A1 | 6/2007 | Piper et al. |
| 2007/0180122 | A1 * | 8/2007 | Barrett ........................... 709/227 |
| 2007/0180448 | A1 | 8/2007 | Low et al. |
| 2009/0248869 | A1 * | 10/2009 | Ghostine ........................ 709/225 |
| 2011/0055372 | A1 * | 3/2011 | Elyashev et al. .............. 709/224 |

FOREIGN PATENT DOCUMENTS

WO WO 2009/032548 3/2009

OTHER PUBLICATIONS

Brown, T., "Hyper-V WMI Using PowerShell Scripts—Part 3 (KVP's—Guest OS Version)," 2009, 4 pages, http://www.addictivenews.com/extView.asp?r=%22http://blogs.msdn.com/taylorb/archive/2008/05/06/hyper-v-wmi-using-powershell-scripts-part-3-kvp-s-guest-os-version.aspx.
Larson, R. et al., Microsoft Press, "Windows Server 2008 Hyper-V Resource Kit," 2009, 43 pages, http://www.virtualizationadmin.com/upl/documents/WindowsServer2008-Hyper-V-ResourceKit-CH02.pdf.
Morimoto, R. et al., "Microsoft Hyper-V Technology Primer," Dec. 12, 2008, 6 pages, http://searchwindowsserver.techtarget.com/generic/0,295582.sid68_gci1342317,00.html.

(Continued)

*Primary Examiner* — Patrice Winder
(74) *Attorney, Agent, or Firm* — Kate Drakos; Micky Minhas

(57) ABSTRACT

Disclosed are techniques for determining the status of virtual machine sessions on a computing device for a user by reading from a memory location written to by a program executing within a virtual machine. The memory location is preferably a registry key that contains the status of a remote user session operating on a guest operating system operational on the virtual machine, the virtual machine executing in a virtual environment comprising a plurality of virtual machines operating on a computing device.

18 Claims, 11 Drawing Sheets

(56) References Cited

OTHER PUBLICATIONS

"Verify Virtual Machine Configuration for RDV," Oct. 5, 2009, 3 pages, http://gallery.technet.microsoft.com/ScriptCenter/en-us/2fc05f02-50b5-45d4-87f7-72bf906e4203.

"Virtualizing SharePoint Series—Monitoring and Managing Virtualized SharePoint Environments," Mar. 11, 2009, 9 pages, http://blogs.msdn.com/uksharepoint/archive/2009/03/11/virtualizing-sharepoint-series-recommendations-for-monitoring-and-managing-a-virtualized-sharepoint-environments.aspx.

"Windows Server 2008 Hyper-V Integration Services," Aug. 13, 2008, 12 pages, http://www.virtualizationadmin.com/articles-tutorials/microsoft-hyper-v-articles/general/windows-server-2008-hyper-v-integration-services.html.

\* cited by examiner

SESSION MONITORING OF VIRTUAL DESKTOPS IN A VIRTUAL MACHINE FARM

BACKGROUND

Remote computing systems may enable users to access resources hosted by the remote computing systems. Servers on the remote computing systems can execute programs and transmit signals indicative of a user interface to clients that can connect by sending signals over a network conforming to a communication protocol such as the TCP/IP protocol. Each connecting client may be provided a session, i.e., an execution environment that includes a set of resources. Each client can transmit signals indicative of user input to the server and the server can apply the user input to the appropriate session. The clients may use protocols such as the Remote Desktop Protocol (RDP) to connect to a server resource. Protocols such as RDP typically handle graphics, device traffic such as USB, printer keyboard and mouse and in addition, virtual channels for application between server and a client. The terminal server hosts client sessions which can be in hundreds in a typical server configuration.

Enabling remote connections to centralized desktops hosted in virtual machines is commonly used for centralized computing scenarios. Deployment of virtual desktops requires load balancing of host computers that host virtual machines, placement of virtual machines on the hosts, and properly orchestrating the startup, wake up, and preparation of virtual machines for receiving connections.

SUMMARY

Aspects of the invention are embodied in a system adapted to connect a client computing device to one of a plurality of virtual machines executing on a plurality of servers. The system preferably facilitates the connection of a client computer to one of a plurality of virtual machines executing on a plurality of servers. The server is a computing device comprising a processor and has a memory that communicates with the computing device when the system is operational. Alternatively methods can be carried out at least partially on the computing device and instructions can be stored on a computer readable medium that carry out aspects of the invention when executed.

In general, a host module determines the status of user sessions operation on a virtual machine by polling a memory location, e.g., a registry key, in which a virtual machine reports the status of user sessions on the virtual machine. The host module can, in turn, report the status information to a server that uses the status information to reconnect remote computing devices with preexisting user sessions. The virtual machine reports status of user sessions by writing the status of said user sessions to the memory location, e.g., the registry key.

Preferably, a virtualization manager polls the values stored in the memory, e.g., the registry key. Preferably, the polling can occur at different rates based on the previous state of the user session. The host module is preferably operating in a second operating system that is operational on the computing device.

DETAILED DESCRIPTION OF ILLUSTRATIVE EMBODIMENTS

Certain specific details are set forth in the following description and figures to provide a thorough understanding of various embodiments of the inventions. Certain well-known details often associated with computing and software technology are not described in the following disclosure for the sake of clarity. Furthermore, those of ordinary skill in the relevant art will understand that they can practice other embodiments of the disclosed subject matter without one or more of the details described below. While various methods are described with reference to steps and sequences in the following disclosure, the description as such is for providing a clear implementation of embodiments of the disclosed subject matter, and the steps and sequences of steps should not be taken as required to practice the invention.

It should be understood that the various techniques described herein may be implemented in connection with hardware or software or, where appropriate, with a combination of both. Thus, the methods and apparatus disclosed herein, or certain aspects or portions thereof, may take the form of program code (i.e., instructions) embodied in tangible media, such as floppy diskettes, CD-ROMs, hard drives, or any other machine-readable storage media that may be loaded into and executed by a machine, such as a computer. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosed subject matter, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Figure 1:
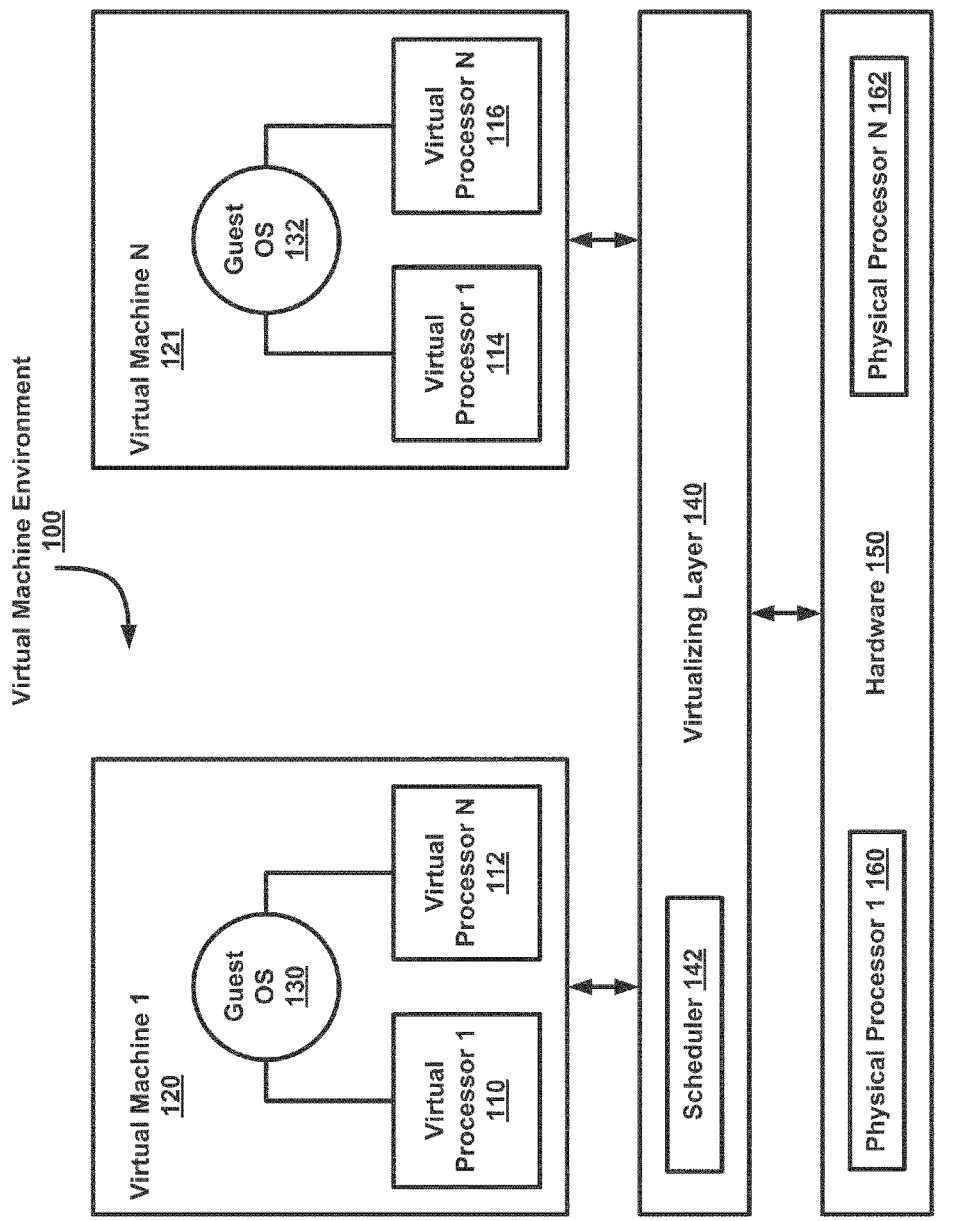
FIG. 1 illustrates a virtual machine environment, with a plurality of virtual machines.

Aspect of a computing environment in which the invention may have application is in virtualized computing. In such a virtualized computing environment, a plurality of virtual machines, each having an independent operating system, operate on the same underlying hardware. Access to the underlying physical hardware by each virtual machine is governed by a program that is sometimes referred to as a virtual machine monitor. A variations of a virtual machine monitor is referred to as a hypervisor. FIG. 1 illustrates a virtual machine environment 100, with a plurality of virtual machines 120, 121, comprising a plurality of virtual processors 110, 112, 114, 116, and corresponding guest operating systems 130, 132. The plurality of virtual processors 110, 112, 114, 116 can provide emulation of various hardware processors 160, 162 and architectures. The virtual machines 120, 121 are maintained by a virtualizing manager 140 (e.g., a hypervisor) which may have a scheduler 142 and other components (not shown). The virtualizing manager 140 mediates the access that virtual machines 120, 121 have to hardware 150.

In some instances, a user may desire to access computing applications remotely, i.e., applications that are running on a separate computing device. One implementation provides a user with such access through a remote desktop. A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a server, such as terminal server (TS). The application processes the input as if the input were entered at the server.

Figure 2:
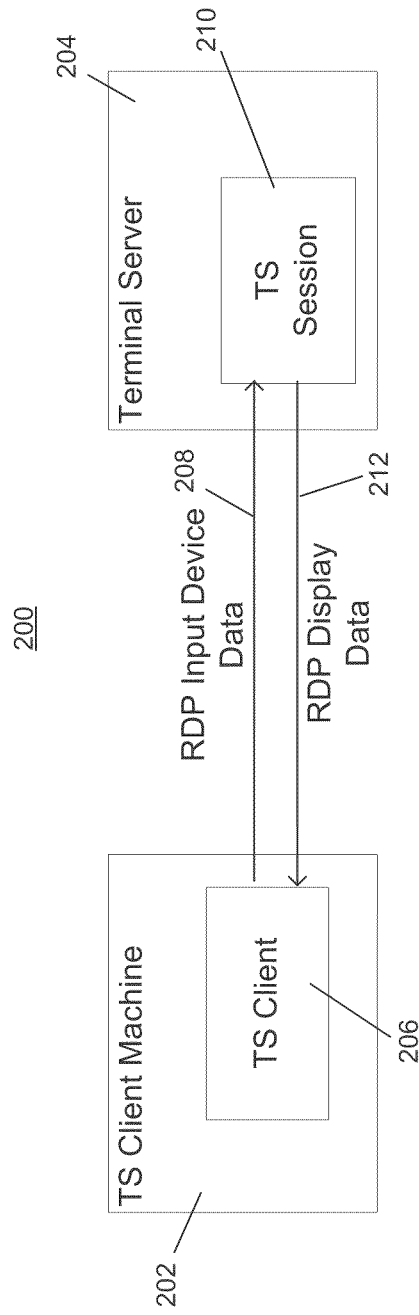
FIG. 2 depicts an operational environment for practicing aspects of the present disclosure.

FIG. 2 shows a diagrammatic overview of the operation of a remote access computing system 200. A TS client machine 202 and a TS 204 communicate using Remote Desktop Protocol (RDP). The TS client machine 202 runs a TS client process 206 that sends RDP input device data 208, such as for example keyboard data and mouse click data, to a TS session 210 that has been spawned on the TS and receives RDP display data 212, such as user interface graphics data. Generally, the TS client process 206 is a thin client process and most processing is provided on the TS 204.

When a remote desktop client connects to a terminal server via a terminal server gateway (not shown), the gateway may open a socket connection with the terminal server and redirect client traffic on the RDP port or a port dedicated to remote access services. The gateway may also perform certain gateway specific exchanges with the client using a terminal server gateway protocol transmitted over HTTPS.

During the TS Session 210, an application running in the session generates output in response to the received input 208 and the output 212 is transferred over the network to the TS client machine 202. The TS client machine 202 runs a TS client program that presents the output data. Thus, input is received and output presented at the TS client machine 202, while processing actually occurs at the terminal server 204. A session can include a shell and a user interface such as a desktop, the subsystems that track mouse movement within the desktop, the subsystems that translate a mouse click on an icon into commands that effectuate an instance of a program, etc. While an application is rendered, a desktop environment may still be generated and hidden from the user. It should be understood that the foregoing discussion is exemplary and that the presently disclosed embodiments may be implemented in various client/server environments and not limited to a particular terminal services product.

An example of a remote access system is Terminal Services™ systems provided by the Microsoft® Corporation. A Terminal Services™ system is discussed in the examples below; however, it is to be appreciated that the techniques discussed are applicable to other remote access systems such as Virtual Network Computing (VNC), Citrix XenApp, and the like.

In a further detailed illustration of a remote computing environment, a connection broker controls the allocation of sessions to users communicating in a remote access system environment. A broker allocates a session to a user based on session state information stored in the broker. Session state information may include, for example, session IDs, user names, names of the servers where sessions are residing, the number of active sessions in each server computer, and so on. As used herein a session may be a virtual desktop session or a terminal services session.

In a remote access system environment, there may be more than one server computer that can service a particular user. As such there is a redirection process that determines where to send a request from a remote computing device that is attempting to connect to a server. In that instance, the remote computing device first connects to a redirector that provides load balancing, etc. of clients. In such a case, a redirection server typically first receives the request for a connection. The redirection server then accepts the connection request and queries the connection broker to determine where the user can be redirected. The connection broker analyzes the session state information of that particular environment and identifies a server to which the user can be redirected. The identified server may posses a session previously accessed by the user, but later disconnected, to which the user can be reconnected again. In an embodiment, an identified server may provide a new session to which the user can be connected, provided the user does not posses any other existing sessions.

The broker sends information to the redirecting server which in turn returns the information to a client to enable the client to establish a connection with the identified server. For example, the information may include a machine ID, a session ID, and location of the identified server. The redirecting server analyzes the information received and redirects the user to the identified server. Once the user establishes the connection with the identified server, the user can access applications present in the identified server. These applications may be compatible to the broker logic that was used in identifying the server from the terminal services environment.

The systems described above may be used to connect, for example, a client computer to one of a plurality of virtual desktops running on a server or to a session on a terminal server. The client computer examines a redirection token in a remote desktop protocol (RDP) packet. The client computer connects to one of the many virtual desktops based on information contained in the redirection token. Use of the redirection token enables integration of the session hosted with one or more virtual machines (VMs) (or terminal servers) with the existing terminal session deployment model. The client computer, using the token, can be appropriately directed to either a virtual desktop or terminal session.

In another embodiment, an RDP client computer is connected to one of the virtual desktops using a connection broker and a pool manager. When the client computers connected, the connection broker assigns the client computer to a virtual desktop hosted in a VM on a VM host server, and the pool manager indicates which of the virtual desktops are available to be assigned.

In a further embodiment, the RDP client computer is connected to a virtual desktop. The RDP client computer indicates an identifier such as pool name that is used by the broker to generate an internet protocol (IP) address to establish connection between the client computer and the virtual desktops. Since the individual virtual desktop IP address is not known until the VM is orchestrated (woken up, started, etc), only a single network name of the redirector is initially required to be externally exposed to the clients. The construction of the virtual desktop and terminal services integration system and an environment in which this integration system may be enabled by techniques is set forth first below with reference to the figures.

Figure 3:
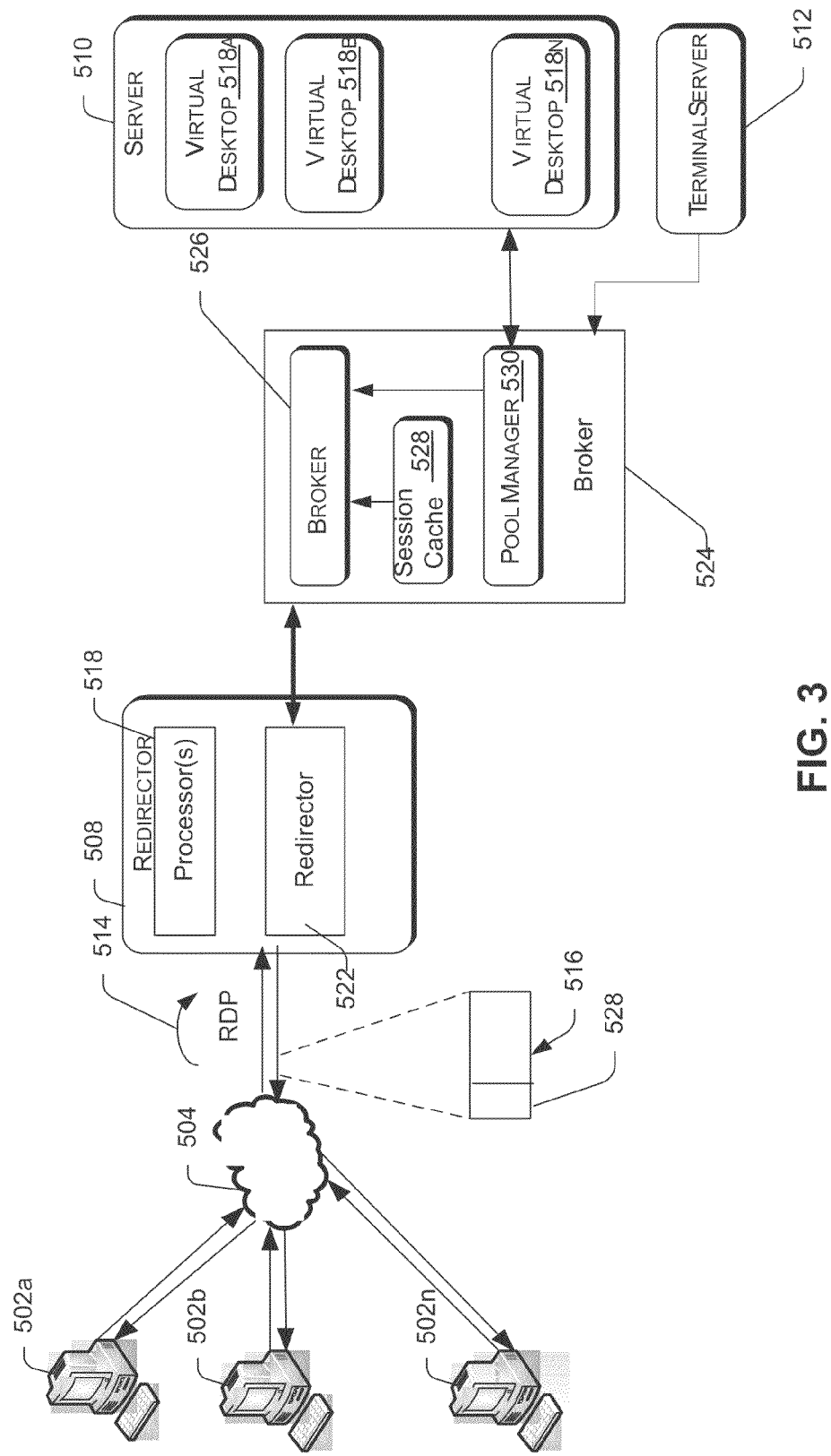
FIG. 3 illustrates an example system in which virtual desktops may be integrated with a terminal server for connecting with client devices.

FIG. 3 further illustrates an example embodiment of the system described above in which there is shown plurality of client devices 502(a-n) connected via network 504, redirector device 508 and broker 524 to virtual desktop server 510 and terminal server 512. In one embodiment, the redirector device 508 and the broker 524 are disposed on the same server. In another embodiment, a gateway (not shown) may be connected between redirector device 508 and network 504 or client devices 502(a-n).

Client devices 502(a-n) may be any computing device capable of communicating with a network 504, and are also referred to as terminal services clients. In one embodiment, the client devices 502(a-n) are general purpose desktop computing devices assigned to users (e.g., employees) that are connected to the wired network 504. Although the illustrated client devices 502(a-n) are depicted as a desktop PC, the client devices may be implemented as any of a variety of conventional computing devices including, for example, a server, a notebook or portable computer, a workstation, a mainframe computer, a mobile communication device, a PDA, an entertainment device, a set-top box, an Internet appliance, a game console, and so forth. In one embodiment, client devices 502(a-n) transmit requests for content, send content and receive content using an RDP protocol 514. Client devices 502(a-n) receive content in an RDP packet 516 format from redirector device 508.

Network 504 may be any type of communications network, such as a local area network, wide area network, cable network, the internet, the World Wide Web or a corporate enterprise network. Content is transmitted from and received by client devices 502(a-n) in a packetized format via network 504 for delivery to and from redirector device 508.

Redirector device 508 includes a processor 518. Included in memory (not shown) may be a redirector module 522. Broker module 524 includes a connection broker module 526, a session cache 528 and a pool manager module 530. Broker module 524 may be disposed in a server, such as server 510, may be disposed in a standalone server or may be disposed within redirector device 508.

Server 510 includes a plurality of virtual desktops 518 (a-n), generally known as virtual machines. Although the illustrated virtual desktops 518(a-n) are shown within 510 server, the virtual desktops 518(a-n) may be individually implemented as any of a variety of conventional computing devices including, for example, a server, a notebook or portable computer, a workstation, a mainframe computer, a mobile communication device, a PDA, an entertainment device, a set-top box, an Internet appliance, a game console, and so forth. Redirector 522 communicates with Broker module 524 on behalf of from clients 502(a-n) to assist with the delivery of RDP packets to broker module 524. Redirector 522 also transmits requests from broker module 524 to establish a connection between one of virtual desktops 518(a-n) and client devices 502(a-n). Such requests are received in broker 524 by connection broker 526. Broker 524 also receives from server 510 an indication of which virtual desktops 518(a-n) are available.

Broker 526 also receives a session cache information 528 indicating criteria which sessions are currently active for various virtual desktops 518(a-n). Connection broker 526 then provides an indication to redirector 522 indicating which one of the virtual desktops 518(a-n) are available for connection (i.e., virtual machines with no active sessions) to one of the client devices 502(a-n). In one embodiment, connection broker 526 may indicate that one of client devices 502(a-n) may connect to terminal server 512. The redirector 522 feeds a packet 516 to one of client devices 502(a-n) containing a redirection token 528, indicating an IP address of the virtual desktop. Also the redirector 522 sends an indication of that the virtual machine is now available for connection to one of client devices 502(a-n). In this embodiment, the broker maintains a list of the names of the virtual desktops and the corresponding IP address of the virtual desktop 518. Thus when an identifier is provided with the client request, the re-director 522 communicates with broker to determine a connection between one of the client devices 502(a-n) with the corresponding virtual desktop 518. The redirector 522 supplies the IP address of the virtual desktop to the client device 502 along with the name of the virtual machine so that client device 502 may directly connect and authenticate to the virtual desktop.

Figure 4:
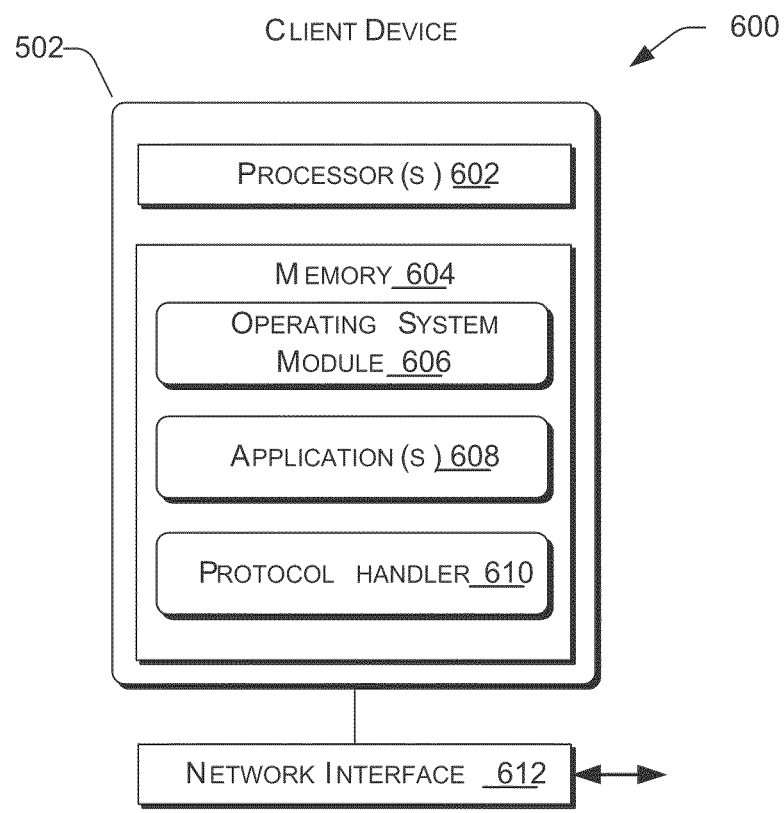
FIG. 4 illustrates a block diagram depicting selected modules in a client computer.

FIG. 4 depicts a block diagram 600 illustrating selected modules in one of client devices 502(a-n) (herein referred to as client device 502) of the integration system 500.

The client device 502 has process capabilities and memory suitable to store and execute computer-executable instructions. In this example, client device 502 includes one or more processors 602, memory 604 and is coupled with network interface 512. The memory 604 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 604 are operating system module 606, application(s) 608, and RDP protocol handler module 512. The modules may be implemented as software or computer-executable instructions that are executed by the one or more processors 602.

The operating system module 606 contains an operating system that may enable the other modules of the client device 502 to receive, process, and exchange data. In addition, the operating system module 606 may also enable the client device 502 to communicate with other devices across a network 504 using network interface 512.

Figure 5:
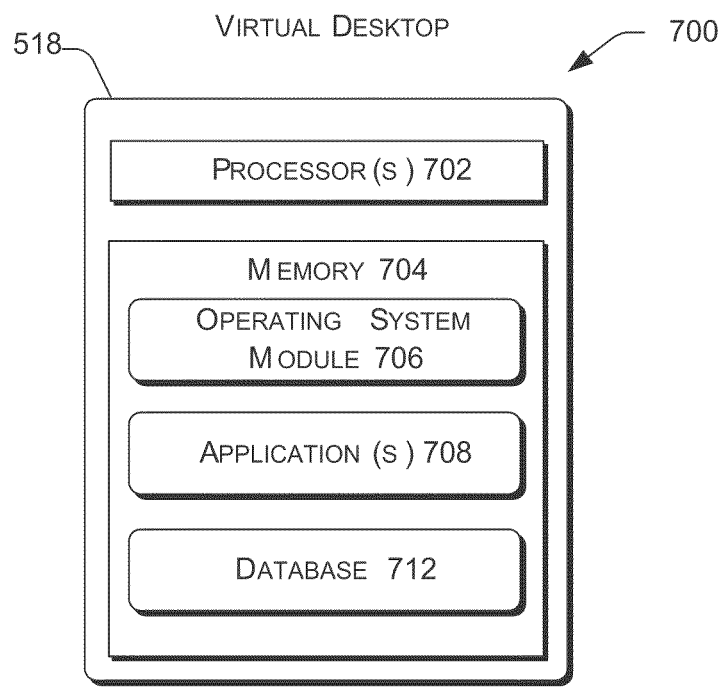
FIG. 5 illustrates a block diagram depicting selected modules in a virtual desktop.

FIG. 5 depicts a block diagram 700 illustrating selected modules in one of virtual desktops 518(a-n) (herein referred to as virtual desktop 518) of the integration system 500. Virtual desktop 518 preferably operates in a virtual machine in a virtualized environment and executes on a server with a plurality of other virtual desktops.

The virtual desktop 518 has process capabilities and memory suitable to store and execute computer-executable instructions. In this example, virtual desktop 518 includes one or more processors 702 (which in the case of a virtual machines system would be virtual processors) and memory 704.

Stored in memory 704 are operating system module 706, one or more application(s) 708, and database 712. The modules may be implemented as software or computer-executable instructions that are executed by the one or more processors 702.

The operating system module 706 contains an operating system that may enable the other modules of the virtual desktop 518 to receive, process, and exchange data. In addition, the operating system module 706 may also enable the virtual desktop 702 to communicate with other devices via redirector device 508.

Figure 6:
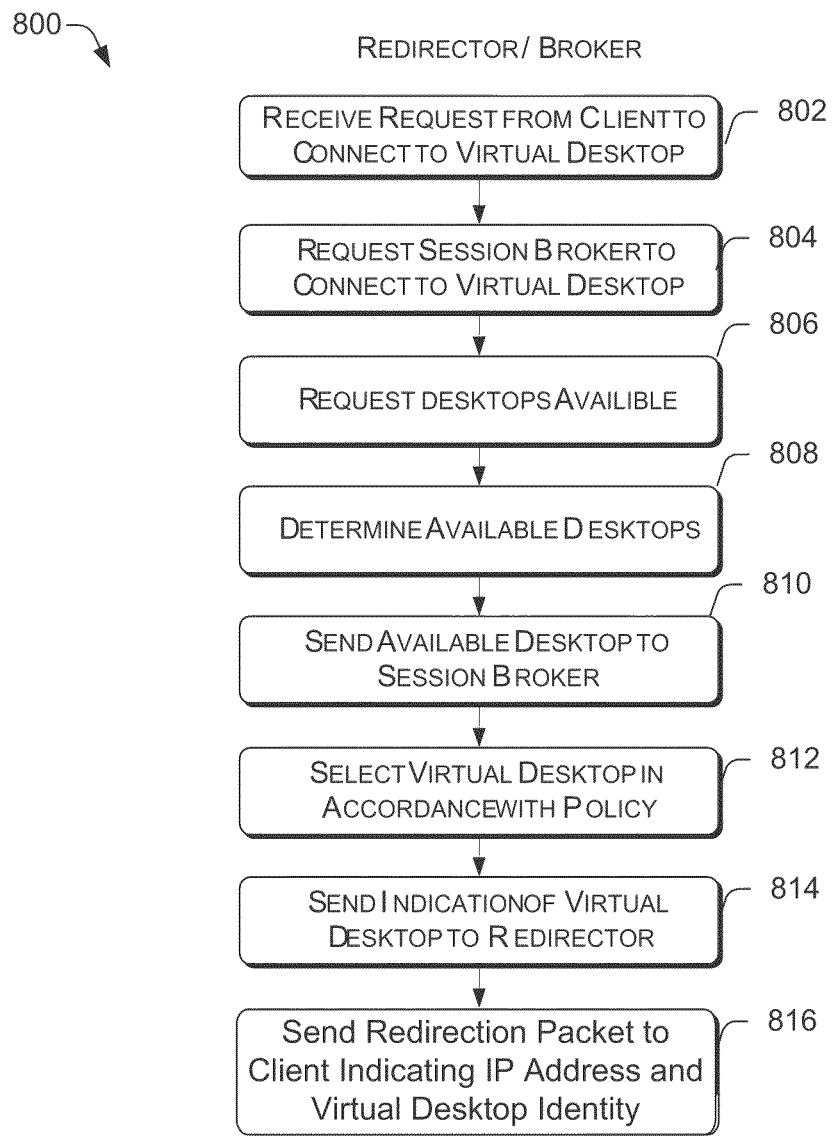
FIG. 6 illustrates a flow diagram of an exemplary process operating on a redirector/broker device for connecting and transferring content between a client device and the virtual desktop.
Figure 7:
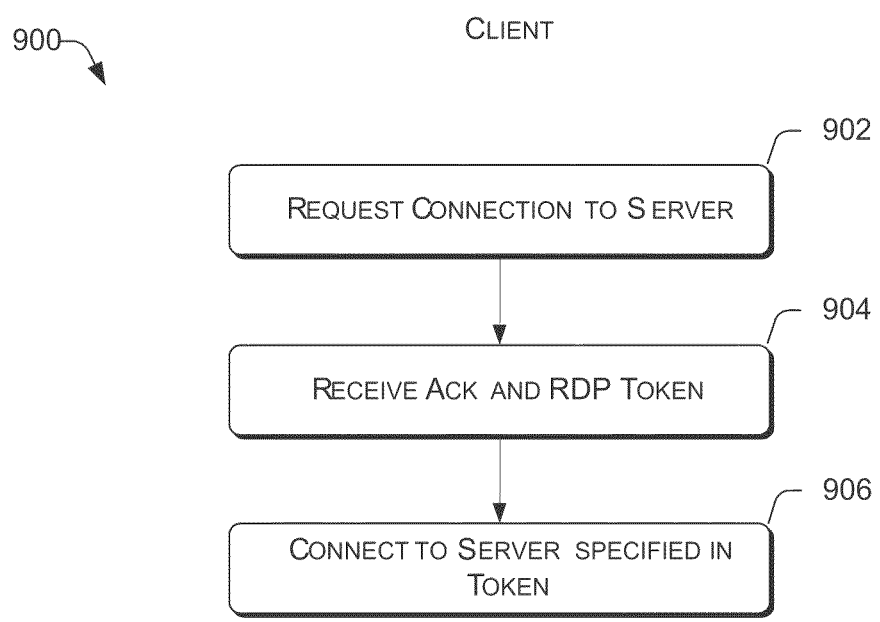
FIG. 7 illustrates a flow diagram of an exemplary process executed with a client device for connecting and transferring content between the client device and the virtual desktop.
Figure 8:
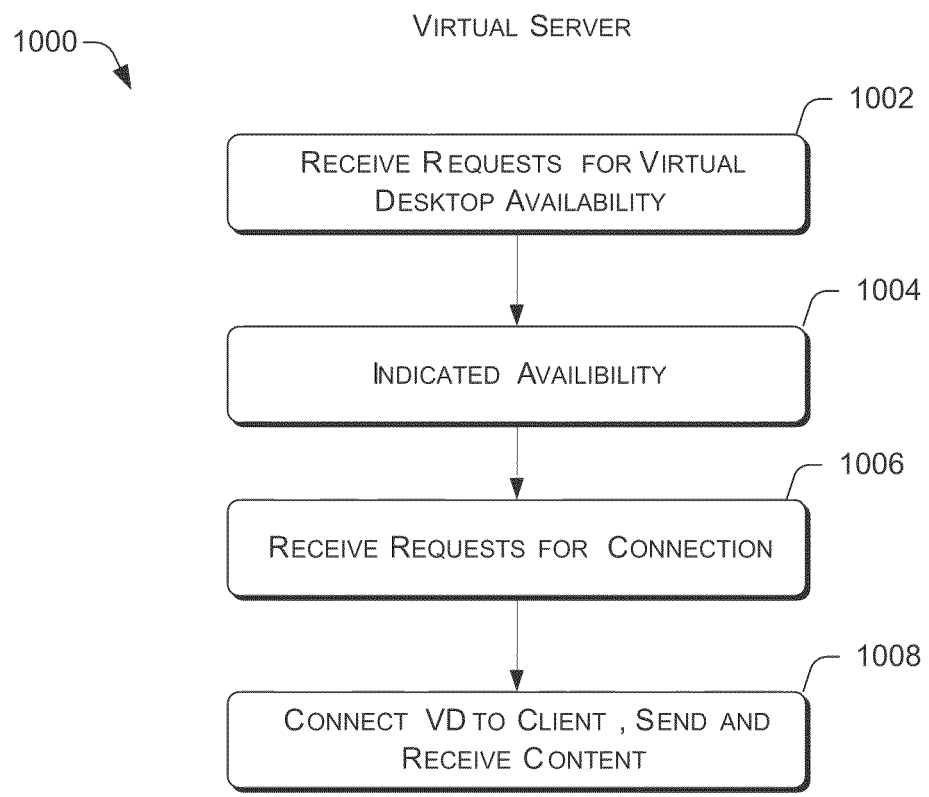
FIG. 8 illustrates a flow diagram of an exemplary process executed with a server device for connecting and transferring content between the client device and the virtual desktop.

The flow diagram in FIG. 6 depicts exemplary processes 802-828 used by processor 518 (see FIG. 3) in redirector device 508 and broker 524 (see FIG. 3), and represents a sequence of operations that can be implemented in hardware, software, and a combination thereof. The flow diagram in FIG. 7 depicts exemplary processes 502-506 used by processor 602 (see FIG. 4) in client device 502 (see FIGS. 3 and 4), and also represents a sequence of operations that can be implemented in hardware, software, and a combination thereof. The flow diagram in FIG. 8 depicts exemplary processes 602-608 used by processor (not shown) in server 510 (see FIG. 3), and additionally represents a sequence of operations that can be implemented in hardware, software, and a combination thereof. In the context of software, the blocks represent computer-executable instructions that, when executed by one or more processors, perform the recited operations.

Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to FIGS. 3 and 5, although it may be implemented in other system architectures.

FIG. 6 illustrates a flow diagram of an exemplary process 800 used by a redirector device 508 and broker 524 to connect client device 502 with a virtual desktop 518 or terminal server 512. At block 802, a request is received from the client device 502 to connect to one of the virtual desktop 518(*a-n*). The request may include the name of the requesting user and an identifier such as virtual desktop pool or personal desktop. Such a request is received by the redirector 522 and is sent to connection broker 526 in block 804. In block 806, the connection broker transmits a request to pool manager 530 requesting available virtual desktops. In block 808, the pool manager 530 determines which virtual desktops 518(*a-n*) are available, by polling the virtual desktops or by reading a table stored in memory that tracks the virtual desktop availability. In one embodiment, the pool manager 530 may determine that the terminal server 552 is available for transmitting and receiving content. In block 810 pool manager 530 provides a notification of virtual desktop availability to connection broker 526.

In block 812, the connection broker 526 reads a table in policy module 528 indicating which of the virtual desktops 518(*a-n*) may be used with a particular client device 502. Such elements of the table may be set by an administrator. In accordance with the table, the virtual desktop 518 is selected and the IP address for the virtual desktop 518 and identity (machine name) is provided to redirector 522 in block 814.

Redirector 522 then sends the IP address and the corresponding name to the client device 502. In block 816, a redirection packet is sent to the client along with the virtual desktop identity so that the client can connect directly to the virtual desktop and authenticate the connection.

FIG. 7 illustrates a flow diagram of an exemplary process 900 used by client device 502 to connect with a virtual desktop 518 or terminal server 512. At block 902, a request is made by the client device 502 to connect to one of the virtual desktops 518(*a-n*). In one embodiment, the request may be made by the device 502 to connect with the terminal server 512. In block 904, the client device 502 may receive an acknowledgment and a token from the redirector device 508 in the RDP packet indicating an IP address and a name of the virtual desktop that the client device 502 will use for connecting to and authenticating with a virtual machine. In block 906, the client device may indicate that name when connecting to the virtual desktop 518. In another example, the name and address may correspond to an IP address of terminal server 512.

FIG. 8 illustrates a flow diagram of an exemplary process 1000 used by server 510, e.g. a VM host, to connect to client device 502. At block 1002, the server 510 receives requests for virtual desktop 518 availability. In block 1004, the server 510 polls its virtual desktops, and feeds an availability indication to server 508. In block 1006, the server 510 receives requests for connection between one of the virtual desktops 518 and one of the client devices. The request may include the IP address of the requested virtual desktop. In block 1008, server 510 indicates that a connection has been established. Further, server 510 both sends content to and receives content from the client device 502.

As noted previously, a user may disconnect from a session or virtual desktop while the session or virtual desktop is still active. When the user reconnects to that session or virtual desktop, the user expects the system to be in the previous state. Consequently, when a user reconnects after disconnecting from a session or virtual desktop, the redirector and broker must locate the previous session so that the user can properly reconnect. The flow chart of FIG. 10 further illustrates aspect of the system described with reference to the system of FIG. 9 and further illustrates aspects of the invention that illustrate how a server tracks virtual desktops that are active within virtual machines operating on a server.

Figure 9:
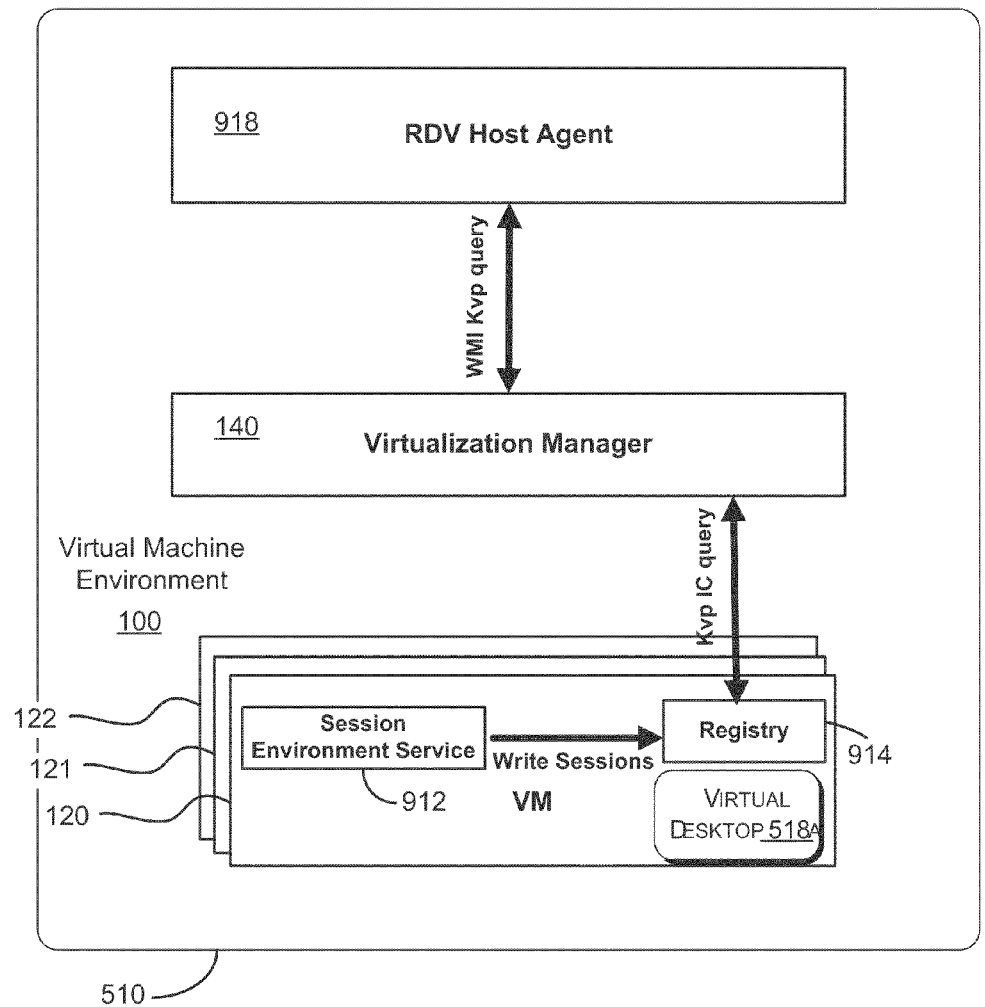
FIG. 9 illustrates a block diagram illustrating an exemplary network architecture for leveraging a remote access system connection broker infrastructure.
Figure 10:
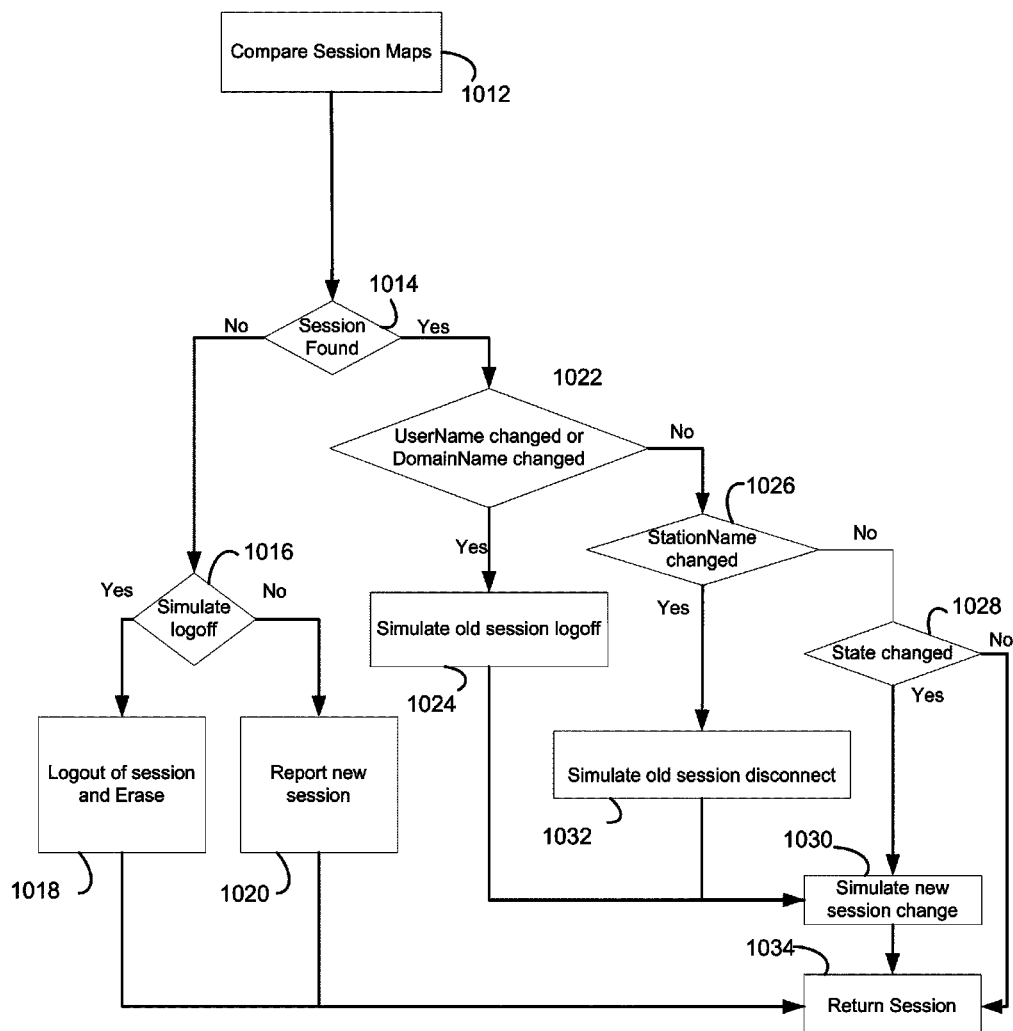
FIG. 10 illustrates a flow chart illustrating an example method for leveraging a remote access system connection broker infrastructure.

As illustrated in FIG. 9 and as previously described with respect to FIG. 1, a virtualization environment 100 may have a plurality of virtual machines 120-122 operable on a single server system. Some of the virtual machines may be active, i.e. running current remote desktop user sessions. For example, virtual machine 120 is illustrated as having an active virtual desktop 518A. Others of the virtual machines may be in a dormant state with no current remote desktop sessions connected. Others may have a current remote desktop connection that is inactive where the previous state of the desktop has been saved. A user who reconnects to such an remote desktop connection may desire or expect to see the previous connection state of the remote desktop. All of the various states of the virtual machines and the states of their respective remote desktop sessions need to be tracked on the server computer and preferably reported to the connection broker so that users can reconnect to disconnected sessions with the previous state.

FIG. 9 further illustrates that the virtual machines have a Session Environment Service 912 that writes the state of the session into the registry 914 of the guest operating system operating on the virtual machine. The information written into registry 914 includes information about the state of the virtual desktop 518A. Virtualization manager 140, e.g., a virtual machine monitor, hypervisor or the like reads the information from registry 914. That information can in turn be communicated to a program, i.e. RDV Host Agent 918, that is operating on a host operating system or in another partition on server 510. The RDV Host Agent 918 can report the information back to Broker 524 for storage in Session Cache 528 (See FIG. 3).

Preferably, session monitoring is based on Microsoft's Hyper-V Key-Value-Pair Integration Component (KVP IC) architecture that allows data exchange between Host and Guest partitions. By using KVP IC the Host partition provides an interface for data exchange by using a specified registry key in the Guest partition. To retrieve data from Guest partition, the Host partition computer instructions make queries to Hyper-V. Consequently, KVP session monitoring has two parts: guest and host.

The guest part is implemented as a separate library that is linked to a Session Environment service 912. The main functions of Session Environment Service 912 is to receive session notifications sent to the service by the Guest OS, enumerate local sessions and save session data to a registry key, e.g., HKLM\Software\Microsoft\Virtual Machine\Guest\Sessions. Preferably, the sessions are saved in the following format:

"Sid=%x;State=%x;User=%s;Domain=%s;Station=%s; LT=%llx;DT=%llx;"

Where:
Sid is session Id.
State is session state.
User is user name.
Domain is user domain name.
Station is host from user is logged on.
LT is user logon time.
DT is user disconnect time.

Preferably, this information should be stored in no more that about 153 characters. Current implementations of KVP IC support text strings of up to 1024 characters long. As a result, a current embodiment can support around 6 sessions. If value of Sessions key in the guest's registry exceeds 1024 characters, host will see "Sessions" property with empty value. In reality we will be able to store a lot more sessions than 6.

Preferably, Session Environment Service 912 will check whether it is running in a virtual machine so that it can avoid CPU-overhead of writing registry keys when running in a NON-virtual environment (i.e. Physical OS). That can be determined by enumerating all hardware devices to detect a virtual machine bus for example.

In one embodiment, the KVP session monitoring is based on continuous polling of registry 914 values by Hyper-V. In general, the last value of the "Sessions" string is compared to the new value. This embodiment relieves the need to use, for example, a networking connection between the Host and Guest OS and avoids the need for network configuration of the Guest OS that may otherwise be needed.

Preferably, the default polling rate used to query value of "Sessions" key are: a fast polling rate of 3 seconds right after orchestration, a medium polling rate of 15 seconds while a user is connected to a VM, and a slow polling rate of 1 minute when no user is connected actively. Polling is for implementation that do not support asynchronous notifications of changed registry-keys. If asynchronous notifications of changed registry-keys was available, that process could also be used. The purpose of the different polling rates is to try to minimize race-conditions wherein a Connection Broker may not have up to date information regarding the session information.

The Session notification module is responsible for simulating session change events by comparing the previous (i.e. the last) and the new values of "Sessions" string. In general, a module, referred to as CompareSessionMaps, preferably takes two indexed arrays with session information parsed from the previous and new values of "Sessions" strings. FIG. 6 provides a flow chart describing the process for determining the session states. In one embodiment, the process is performed twice. First it is performed as comparing previous values to new values to determine which sessions have changed. Second, it is performed as comparing new values to previous values to determine which sessions are gone.

At step 1012 two session maps are compared. The first time, the comparison will compare the previous values to the new values. In step 1014, if the session is not found then it is an indication that the session no longer exists. Consequently, at step 1016 a determination is made to simulate a logout. The session is erased from the host list of sessions at step 1018. The other case, at step 1020 is when the new sessions are compared to old sessions. In that case, when there is a new session, it would not be found at step 1014 and no logoff would be simulated at step 1016. In that case, a new session is reported at step 1020.

If a session is found at step 1014, i.e. there are values for both the previous and the new sessions, then a comparison is made to determine if there has been a change to the username or the domain name at step 1022. If so, the previous session is logged off at step 1024. If the station has changed as determined at step 1026, then there is an indication that the previous session was disconnected at step 1032. If the state has changed as determined at step 1028, then the new session information is updated at step 1030 and the session is returned at step 1034.

Any of the above mentioned aspects can be implemented in methods, systems, computer readable media, or any type of manufacture. For example, a computer readable medium can store thereon computer executable instructions for connecting a remote client computer to one of a plurality of virtual machines executing on a plurality of servers.

Figure 11:
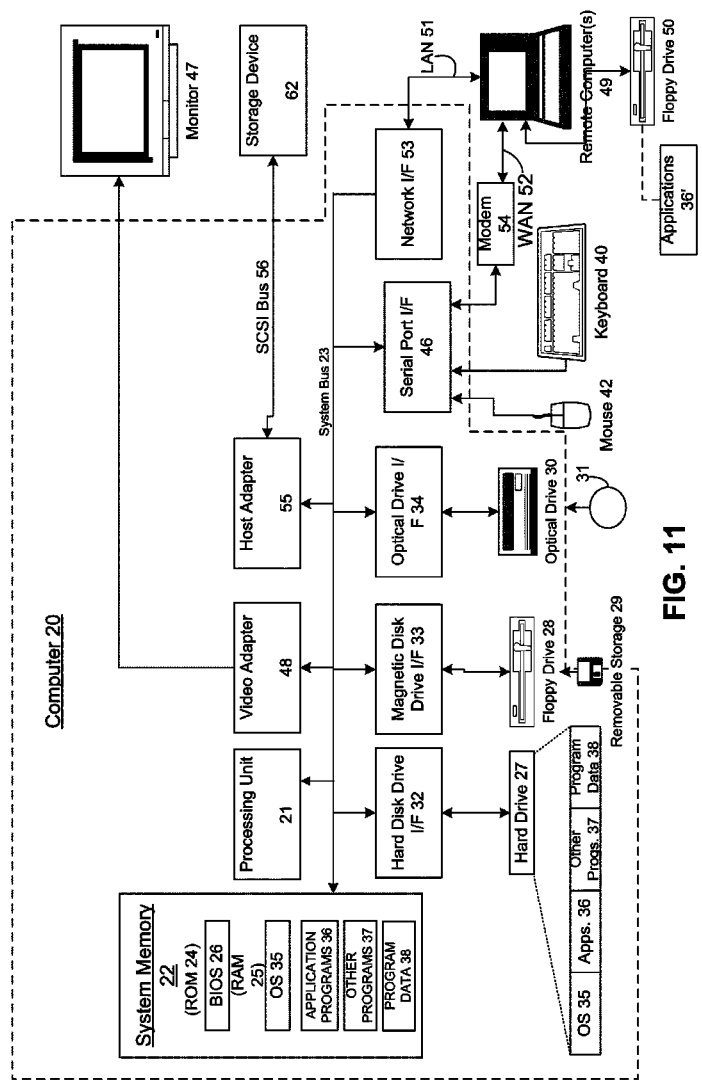
FIG. 11 depicts an example computer system.

As described above, aspects of the presently disclosed subject matter may execute on a programmed computer. FIG. 11 and the following discussion is intended to provide a brief description of a suitable computing environment in which the those aspects may be implemented. One skilled in the art can appreciate that the computer system of FIG. 1 can in some embodiments effectuate the server and the client of FIGS. 2-4. In these example embodiments, the server and client can include some or all of the components described in FIG. 11 and in some embodiments the server and client can each include circuitry configured to instantiate specific aspects of the disclosed embodiments.

The term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s).

FIG. 11 depicts an example of a computing system which is configured to with aspects of the disclosed subject matter. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosed subject matter may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 11 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the presently disclosed subject matter are particularly well-suited for computer systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects and embodiments of the subject matter described herein have been shown and described, it will be apparent to those skilled in the art that, based upon the teachings herein, changes and modifications may be made and, therefore, the appended claims are to encompass within their scope all such changes and modifications as are within the true spirit and scope of the subject matter described herein.

What is claimed:

1. A method comprising:
   writing from computer instruction executing within a virtual machine information into a memory location regarding the status of a remote user session operating on a guest operating system of the virtual machine, the virtual machine executing in a virtual environment comprising a plurality of virtual machines operating on a computing device;
   polling at a dynamic rate the status of the remote user session from the memory location by a host module operating on the computing device, the dynamic rate being defined based on a previous status of the remote user session written into the memory location; and
   updating a second computing device with the status of the user session.

2. The method of claim 1, wherein the polling at a dynamic rate the status of the remote user session from the memory location comprises reading a registry key within the guest operating system.

3. The method of claim 2, wherein a virtualization manager comprises the host module, and wherein the virtualization managed polls values stored in the registry key.

4. The method of claim 1, wherein the second computing device comprises a server that tracks user sessions by way of information received from the computing device hosting the virtual machine.

5. The method of claim 4, wherein the information tracked includes session state.

6. The method of claim 1, wherein the host module is operating in a second operating system that is operational on the computing device.

7. A system adapted to connect a client computer to one of a plurality of virtual machines executing on a plurality of servers, comprising:
    at least one computing device comprising a processor; and
    at least one memory communicatively coupled to said at least one computing device when the system is operational, the memory having stored therein computer-executable instructions that when executed cause:
        a host module configured to determine a current state of a user session operating on a virtual machine by polling at a rate a memory location in which the virtual machine reports the current state of the user session, the host module reporting information about the current state to a server, the information allowing the server to reconnect a remote computing device with the user session, the rate being changed based on a previous state of the user session from the memory location; and
        the virtual machine configured to report the current state of the user session on the virtual machines by writing the current state of the user session to the memory location.

8. The system of claim 7 wherein the system is one of a plurality of servers in a server farm.

9. The system of claim 7 wherein the memory location is a registry key within a guest operating system.

10. The system of claim 9, the at least one memory having stored therein computer-executable instructions that when executed cause:
    a virtualization manager program to poll values stored in the registry key by the computer instructions executing within the virtual machine.

11. The system of claim 9, wherein the host module is operating in a second operating system that is operational on the computing device.

12. The system of claim 7, wherein the information allows the server to track the user session.

13. The system of claim 12, wherein the user session is reconnected to the remote computing device by using Remote Desktop Protocol (RDP).

14. A computer-readable storage medium storing thereon computer executable instructions for facilitating a connection of a client computing device to one of a plurality of virtual machines executing on a plurality of servers, the computer executable instructions upon execution on a system cause the system to at least:
    receive at a server of the plurality of servers information about the connection from the client computing device, the information being indicative of a virtual machine session;
    determine whether the virtual machine session is hosted on a server of the plurality of servers by polling at a predefined rate a memory location for a current state of the virtual machine session, the current state being written to the memory location by a virtual machine of the plurality of virtual machines, the predefined rate being adjusted based on a previous state of the virtual machine session stored in the memory location; and
    facilitate the connection between the client computing device and the server that hosts the virtual machine session based on the determination.

15. The computer-readable medium of claim 14 wherein the memory location is a registry key within a guest operating system of the virtual machine.

16. The computer-readable medium of claim 15, wherein the computer executable instructions upon execution on the system further cause the system to at least instantiate a virtualization manager program that polls values stored in the registry key.

17. The computer-readable medium of claim 14, wherein the computer executable instructions upon execution on the system further cause the system to at least report the current state of the virtual machine session to a server that tracks virtual machine sessions.

18. The computer-readable medium of claim 14, wherein the computer executable instructions upon execution on the system further cause the system to at least instantiate a host module in a second operating system for polling the memory location, the virtual machine session being executed by a first operating system.

* * * * *